(12) United States Patent
Palazzolo

(10) Patent No.: US 9,578,886 B2
(45) Date of Patent: Feb. 28, 2017

(54) UNITARY ELASTIC MOLD AND CUTTER COMBINATION

(71) Applicant: Dominic Palazzolo, Cincinnati, OH (US)

(72) Inventor: Dominic Palazzolo, Cincinnati, OH (US)

(*) Notice: Subject to any disclaimer, the term of this patent is extended or adjusted under 35 U.S.C. 154(b) by 92 days.

(21) Appl. No.: 14/633,784

(22) Filed: Feb. 27, 2015

(65) Prior Publication Data

US 2015/0164103 A1  Jun. 18, 2015

Related U.S. Application Data

(62) Division of application No. 13/043,955, filed on Mar. 9, 2011, now Pat. No. 9,033,693.

(51) Int. Cl.
*A21C 11/10* (2006.01)
*A23G 3/34* (2006.01)
(Continued)

(52) U.S. Cl.
CPC ............ *A23G 3/0027* (2013.01); *A21C 11/02* (2013.01); *A21C 11/10* (2013.01); *A21C 11/106* (2013.01);
(Continued)

(58) Field of Classification Search
CPC .. A23G 3/0025; A23G 3/0027; A23G 3/0034; A23G 3/0038; A23G 3/0061; A23G 3/0236; A23G 3/0252; A23G 3/0273; A23G 3/0284; A23G 1/226; A23P 1/10; A23P 1/105; B29K 2883/005; B29C 33/40; B29C 33/405; B29C 33/50; B29C 43/40; B29C 43/50; B29C 2043/3652; B29C 2793/00; B29C 49/50; B29C 51/32; A21C 11/106
(Continued)

(56) References Cited

U.S. PATENT DOCUMENTS 1,874,511 A * 8/1932 Habermaas ............ A21C 3/021
                                                          425/299
4,384,838 A * 5/1983 Laughlin .............. A21C 11/106
                                                          249/102
(Continued)

*Primary Examiner* — Alison L Hindenlang
*Assistant Examiner* — Lawrence D Hohenbrink, Jr.
(74) *Attorney, Agent, or Firm* — Steve Witters; Witters & Associates

(57) ABSTRACT

A unitary elastic mold and cutter combination configured to mold and cut moldable material is disclosed herein. The mold and cutter combination comprises an elastic mold cavity having an elastic bottom wall with an embossed inner surface and an elastic sidewall extending from and unitary with a perimeter of the bottom wall. An elastic cutting blade extends from and is unitary with the sidewall of the mold cavity and is configured to cut moldable material and maintain a substantially consistent perimeter upon cutting. The cutting blade comprises a cutting edge disposed between an inner cutting blade surface and an outer cutting blade surface. The mold and cutter combination may have an elasticity sufficient to release molded material therefrom by hand stretching, wherein the cutting edge, inner cutting blade surface, and the inner surface of the sidewall of the mold cavity are stretched by an amount sufficient to release the molded material.

19 Claims, 7 Drawing Sheets

(51) Int. Cl.
*A21C 11/02* (2006.01)
*A23G 4/04* (2006.01)
*B29C 43/40* (2006.01)
 B44C 3/04 (2006.01)
 B29C 49/52 (2006.01)
 A23G 3/28 (2006.01)
 B30B 15/02 (2006.01)
 A23G 3/02 (2006.01)
 A23G 1/22 (2006.01)
 B29C 43/50 (2006.01)
 B29C 51/32 (2006.01)
 B29C 33/40 (2006.01)
 B29C 49/50 (2006.01)
 B29C 43/36 (2006.01)
 B29C 33/50 (2006.01)

(52) U.S. Cl.
CPC ............. *A23G 3/0038* (2013.01); *A23G 4/04* (2013.01); *B29C 43/40* (2013.01); *A23G 1/226* (2013.01); *A23G 3/0025* (2013.01); *A23G 3/0034* (2013.01); *A23G 3/0061* (2013.01); *A23G 3/0236* (2013.01); *A23G 3/0247* (2013.01); *A23G 3/0252* (2013.01); *A23G 3/0273* (2013.01); *A23G 3/0284* (2013.01); *A23G 3/28* (2013.01); *B29C 33/40* (2013.01); *B29C 33/405* (2013.01); *B29C 33/50* (2013.01); *B29C 43/50* (2013.01); *B29C 49/50* (2013.01); *B29C 49/52* (2013.01); *B29C 51/32* (2013.01); *B29C 2043/3652* (2013.01); *B29C 2793/00* (2013.01); *B29K 2883/005* (2013.01); *B30B 15/024* (2013.01); *B44C 3/04* (2013.01); *B44C 3/048* (2013.01); *Y10S 425/124* (2013.01)

(58) Field of Classification Search
USPC ........ 264/163; 426/496, 497, 502, 505, 512, 426/518, 389
See application file for complete search history.

(56) References Cited

U.S. PATENT DOCUMENTS

| 9,102,096 | B2* | 8/2015 | Palazzolo | ............. A21C 11/10 |
| 2003/0003207 | A1* | 1/2003 | Capodieci | ............. A21C 11/08 426/421 |

* cited by examiner

UNITARY ELASTIC MOLD AND CUTTER COMBINATION

RELATED APPLICATIONS

This application is a divisional application of U.S. application Ser. No. 13/043,955, filed Mar. 9, 2011, the entire contents of which is hereby incorporated by reference herein in its entirety.

FIELD OF THE DISCLOSURE

This disclosure relates generally to molds and cutters configured to mold and cut moldable materials.

BACKGROUND

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Cutters configured to cut moldable materials, such as clay and dough, have been and are currently used in a large variety of applications. For example, cookie cutters have been used for many years to form an outer perimeter shape of cookie dough prior to baking. Molds have also been used for shaping surfaces of materials into desired shapes. For example, the use of molds with an embossed pattern on a wall of a mold cavity is common in shaping moldable materials, such as clay and confectionery compounds such as rolled fondant, modeling chocolate and gum paste. However, apparatuses configured to cut moldable material may have sharp cutting blades, creating health and safety concerns. For example, human skin may be punctured or lacerated from a slicing or entrapment of fingers and parts of the hand while using known apparatuses configured to cut moldable material. Additionally, apparatuses configured for cutting and molding moldable materials are typically separate apparatuses or require an apparatus to have multiple component parts. This may increase labor costs associated with usage, cleaning, and maintenance of the apparatus(es). Further, molds and cutters currently in use may not allow easy removal of material therefrom. For example, current cutters or molds having a complex perimeter shape of a cutter and/or detail in an embossing pattern in a mold may cause a mold or cutter to captured material within the cutter and/or embossed surface of a mold.

What is needed is a mold and cutter combination that overcomes some of the obstacles associated with currently available molds and cutters.

SUMMARY

In one aspect of the present disclosure, a unitary elastic mold and cutter combination is disclosed. The mold and cutter combination is configured to mold and cut moldable material and comprises an elastic mold cavity having a bottom wall with an embossed inner surface, an elastic sidewall extending from and unitary with a perimeter of the bottom wall, and an elastic cutting blade extending from and unitary with the sidewall of the mold cavity. The cutting blade is configured to cut moldable material and maintain a substantially consistent perimeter upon cutting. The elastic cutting blade comprises a cutting edge, an inner cutting blade surface extending outward from an inner surface of the sidewall of the mold cavity and to the cutting edge, and an outer cutting blade surface extending from the cutting edge and extending toward a plane of the mold cavity bottom wall. The unitary elastic mold and cutter combination may have an elasticity sufficient to release molded material therefrom by hand stretching the mold and cutter combination wherein the cutting edge, the inner cutting blade surface, and the inner surface of the sidewall of the mold cavity are stretched by an amount sufficient to release the molded material therefrom.

In another aspect of the present disclosure, a mold and cutter combination is disclosed. The mold and cutter combination comprises a mold cavity having a bottom wall with an embossed inner surface and a sidewall extending from and unitary with the bottom wall of the mold cavity. A cutting blade extends from and is unitary with the sidewall of the mold cavity, the cutting blade is configured to cut moldable material and maintain a substantially consistent perimeter upon cutting. The mold and cutter combination is configured to release molded material therefrom by hand.

In a further aspect of the present disclosure, a mold and cutter combination comprises a stretchable bottom wall, a stretchable sidewall extending from a perimeter of the stretchable bottom wall, and a stretchable cutting edge extending from the stretchable sidewall.

BRIEF DESCRIPTIONS OF THE DRAWINGS

The following figures, which are idealized, are not to scale and are intended to be merely illustrative of aspects of the present disclosure and non-limiting. In the drawings, like elements are depicted by like reference numerals. The drawings are briefly described as follows.

DETAILED DESCRIPTION

Reference will now be made in detail to the present exemplary embodiments and aspects of the present invention, examples of which are illustrated in the accompanying figures. Wherever possible, the same reference numbers will be used throughout the figures to refer to the same or like parts.

Aspects of the present disclosure provide a single unitary apparatus configured to cut and mold moldable material and release the molded and cut material therefrom. Moldable materials may be edible or non-edible. For example, clay, fondant, gumpaste, modeling chocolate, pastillage, cookie dough, and other confectionary compositions and craft moldable compounds may be molded and cut into a desired shape, in a single process step, with a single apparatus configured to mold and cut the moldable material. Aspects of the present disclosure may be advantageously used to shape or form and cut sheetable materials, such as rolled fondant or clay.

Figure 1:
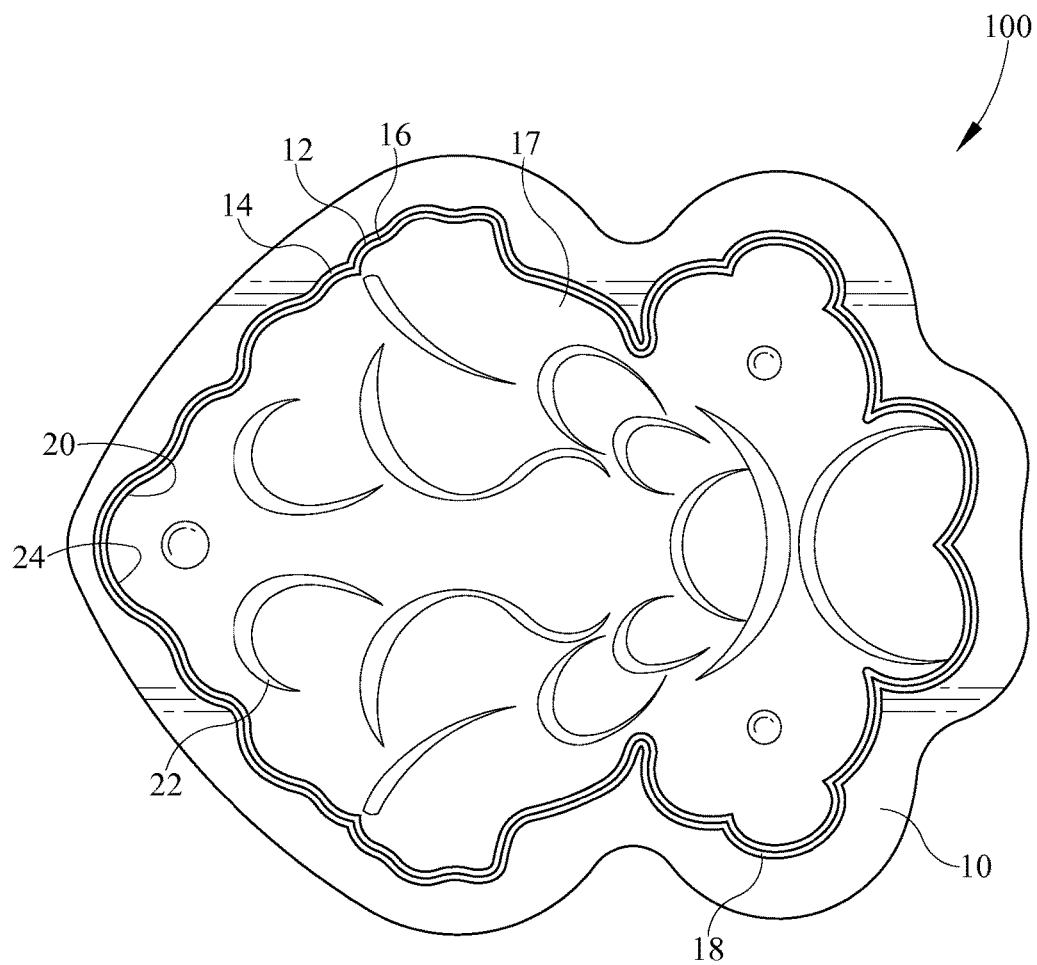
FIG. 1 is a top view of a unitary elastic mold and cutter combination showing the disposition of features thereof.
Figure 2:
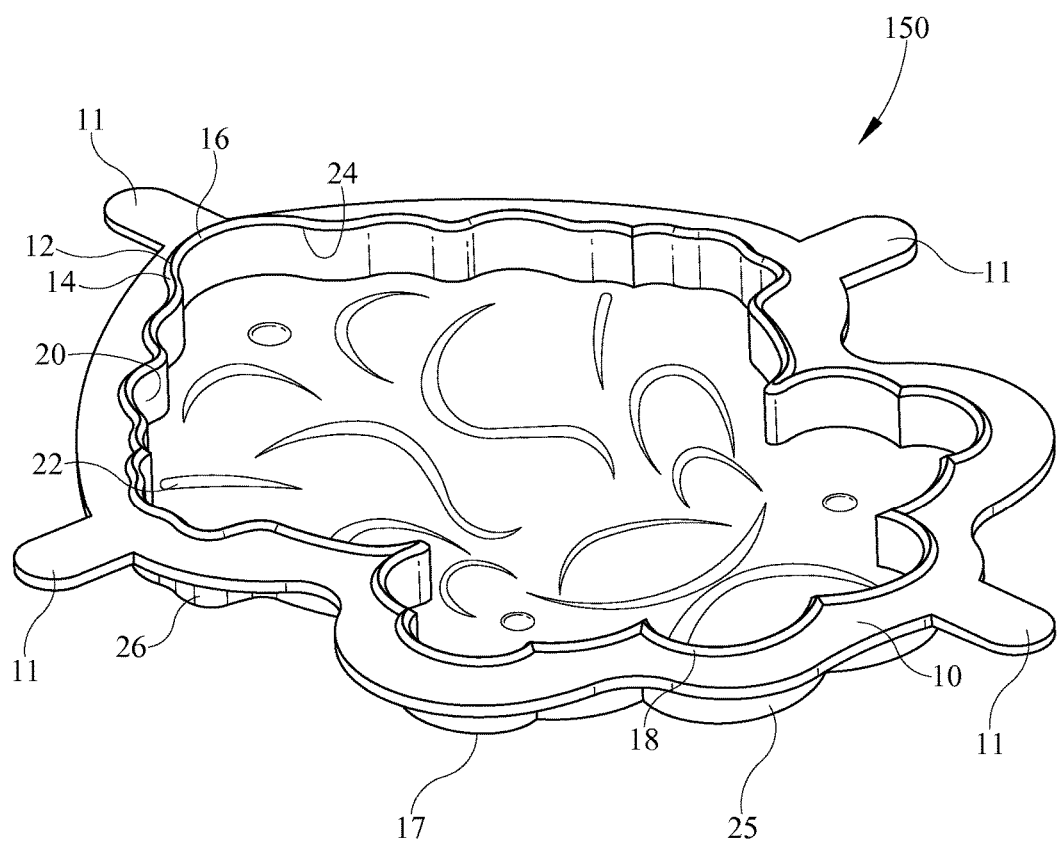
FIG. 2 is a perspective view of the unitary elastic mold and cutter combination of FIG. 1 showing walls of a mold cavity in conjunction with other features thereof.

FIGS. 1 and 2 show unitary elastic mold and cutter combinations 100 and 150 and the disposition of features thereof. Mold and cutter combinations 100 and 150 are unitary in construction and may be comprised of common materials throughout. The material or materials making up mold and cutter combinations 100 and 150 may be stretchable, flexible, elastic, or have other and additional properties. For example, mold and cutter combinations 100 and 150 may comprise polymeric materials, rubber, and silicone. In an aspect comprising silicone, moldable material may be heated or cooked in the mold cavity of mold and cutter combination 100. For example, it may be advantageous for mold and cutter combinations 100 and 150 to be comprised of a elastic material having a melting or softening point above 400° F.

Unitary elastic mold and cutter combinations 100 and 150 may be configured to mold and cut moldable material and may comprise an elastic mold cavity having an elastic bottom wall 17 and an elastic sidewall 25. Bottom wall 17 may comprise an embossed inner surface 22. Elastic sidewall 25 may extend from and be unitary with a perimeter of bottom wall 17. Elastic cutting blade 18 may extend from and be unitary with sidewall 25 of the mold cavity. Cutting blade 18 may be configured to cut moldable material and maintain a substantially consistent perimeter upon cutting.

Elastic cutting blade 18 may have a wedge shaped, rounded shape, and/or other shape configured to cut moldable material. Cutting blade 18 may comprise a cutting edge 12, an inner cutting blade surface 16 extending outward an inner surface 20 of sidewall 25 to cutting edge 12, and an outer cutting blade surface 14 extending from cutting edge 12 and extending toward a plane of bottom wall 17. Cutting edge 18 may be rounded or pointed. Inner cutting blade surface 16 and outer cutting blade surface 14 may be planar or curved. Inner cutting blade surface 16 and outer cutting blade surface 14 may each slope or curve from cutting edge 12 toward a plane of bottom wall 17 by a substantially equal amount.

Unitary elastic mold and cutter combinations 100 and 150 may further comprise a demolding lip 10 extending outwardly from an outer surface 26 of mold cavity sidewall 25. Demolding lip 10 may be proximate outer cutting blade surface 14 and may extend a substantially equal distance from outer surface 26 of mold cavity sidewall 25 throughout its outer perimeter as shown with mold and cutter combination 100. However, it is to be understood that demolding lip 10 may have widenings, portions with a greater distance from outer surface 26, or tabs 11, as shown with mold and cutter combination 150. Tabs 11 may indicate preferred pulling directions or areas and may increase the ability to grasp and to stretch portions of mold and cutter combination 150 for the removal of molded material. For example, mold and cutter combination 150 may have tabs 11 extending a greater distance from outer surface 26 than other portions of demolding lip 10. In another aspect of a mold and cutter combination disclosed herein, tabs 11 may extend directly from outer surface 26 of mold cavity sidewall 25 and there need not be a demolding lip 10 extending about outer surface 26.

Unitary elastic mold and cutter combination 100 may have an elasticity sufficient to release molded material therefrom by hand stretching. For example, unitary elastic mold and cutter combination 100 may have an elasticity sufficient to release molded material therefrom by hand stretching wherein cutting edge 12, inner cutting blade surface 16, and inner surface 20 of sidewall 25 are stretched by an amount sufficient to release the molded material therefrom. Additionally, bottom wall 17 of the mold cavity may have an elasticity sufficient to release molded material therefrom by hand stretching mold and cutter combination 100 wherein an embossed pattern on bottom wall inner surface 22 is stretched by an amount sufficient to release molded material from the embossed pattern.

Figure 3:
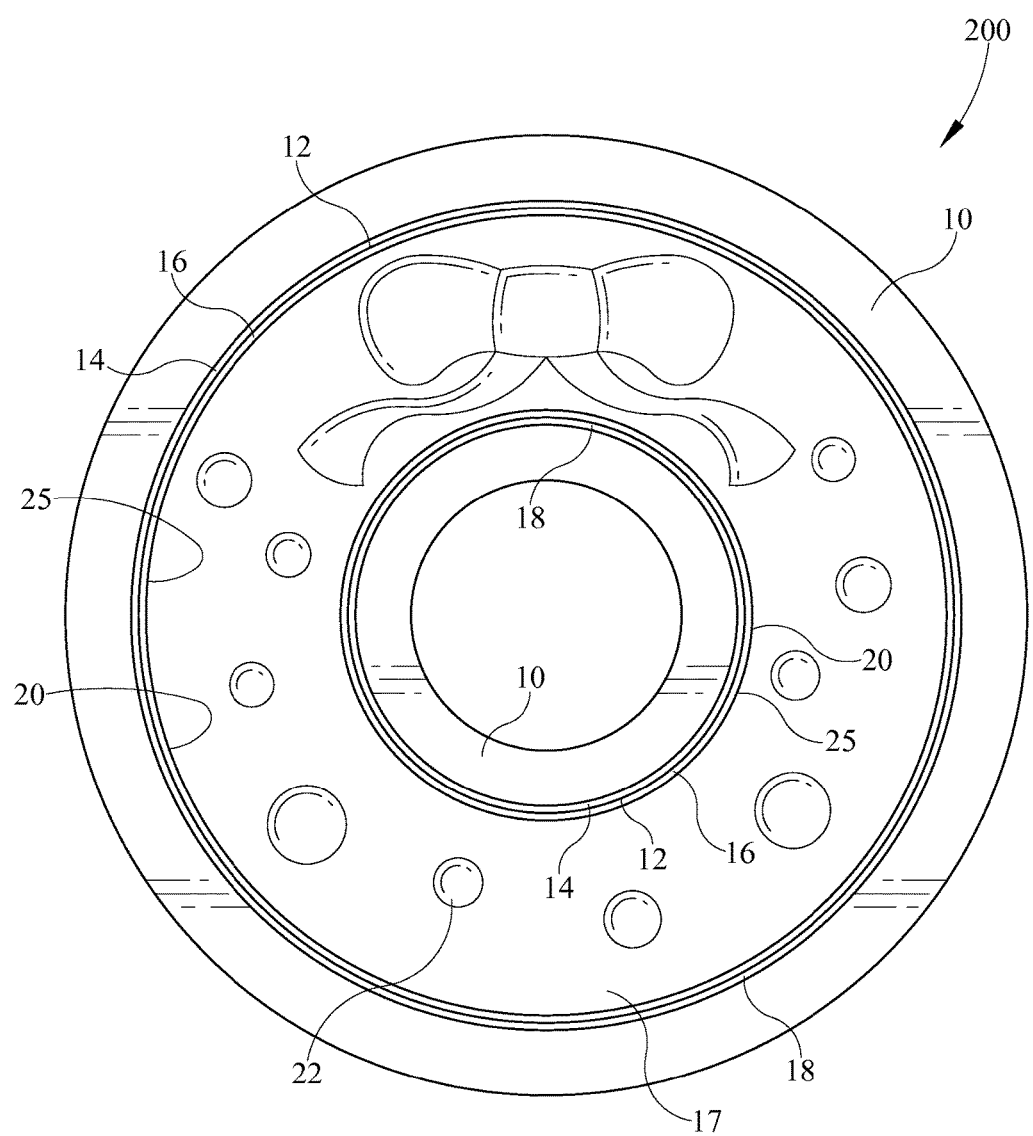
FIG. 3 is a perspective view of a unitary elastic mold and cutter combination having two cutting blades.

FIG. 3 shows unitary elastic mold and cutter combination 200 having two cutting blades 18 and the disposition of features thereof. Unitary elastic mold and cutter combination 200 may be configured to mold and cut moldable material wherein the cut moldable material has at least two cuts. Bottom wall 17 may be elastic and may comprise an embossed inner surface 22. Cutting blades 18 may be configured to cut moldable material and maintain a substantially consistent perimeter upon cutting. Elastic cutting blades 18 may extend from and be unitary with elastic sidewalls 25. Each elastic sidewall 25 may extend from and be unitary with a perimeter of bottom wall 17.

Elastic cutting blades 18 may have a wedge shape, rounded shape, and/or other shape configured to cut moldable material. Each cutting blade 18 may comprise a continuous cutting edge 12, an inner cutting blade surface 16 extending outward from an inner surface 20 of each sidewall 25 to cutting edge 12, and an outer cutting blade surface 14 extending from cutting edge 12 and extending toward a plane of bottom wall 17. Cutting edges 18 may be rounded or pointed. Inner cutting blade surfaces 16 and outer cutting blade surfaces 14 may be planar or curved. Inner cutting blade surfaces 16 and outer cutting blade surfaces 14 may each slope or curve from a cutting edge 12 toward a plane of bottom wall 17 by a substantially equal amount.

Unitary elastic mold and cutter combination 200 may further comprise demolding lips 10 extending from one or both sidewalls 25. Demolding lips 10 may extend a substantially equal distance from sidewalls 25 throughout their outer perimeters.

Unitary elastic mold and cutter combination 200 may have an elasticity sufficient to release molded material therefrom by hand stretching. For example, bottom wall 17 of the mold cavity may have an elasticity sufficient to release molded material therefrom by hand stretching mold and cutter combination 200 wherein an embossed pattern on bottom wall inner surface 22 is stretched by an amount sufficient to release molded material from the embossed pattern. For example, a user may stretch a portion of mold and cutter combination 200 by grasping and pulling apart outer demolding lip 10 and inner demolding lip 10, at similar radiuses about the circumference of mold and cutter combination 200.

Figure 4:
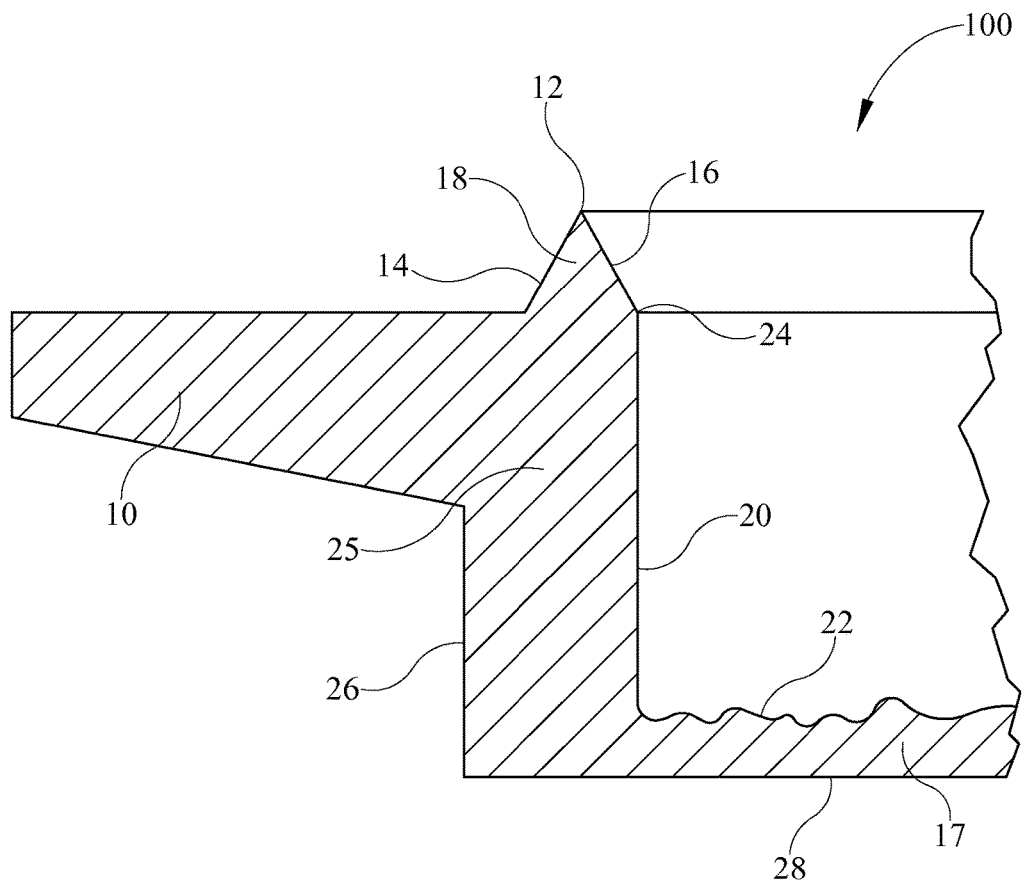
FIG. 4 is a cross-sectional view of a portion of the unitary elastic mold and cutter combination of FIG. 1 showing the disposition of a cutting blade with respect to a mold cavity.

FIG. 4 shows a cross-sectional view of an outer portion of unitary elastic mold and cutter combination 100. Mold and cutter combination 100 is unitary in construction and may be comprised of common materials throughout. Advantageously, mold and cutter combination 100 is comprised of an elastic material wherein it resumes its original shape after being stretched. Unitary elastic mold and cutter combination 100 may be configured to mold and cut moldable material and may comprise an elastic mold cavity having an elastic bottom wall 17 and an elastic sidewall 25. Bottom wall 17 may comprise an embossed inner surface 22 and outer surface 28. Elastic sidewall 25 may extend from and be unitary with a perimeter of bottom wall 17. Elastic cutting blade 18 may extend from and be unitary with sidewall 25. Cutting blade 18 may be configured to cut moldable material and maintain a substantially consistent perimeter upon cutting.

Elastic cutting blade 18 may have a wedge shaped as is shown in FIG. 4. Cutting blade 18 may comprise cutting edge 12, inner cutting blade surface 16, and outer cutting blade surface 14. Inner and outer cutting blade surfaces 16 and 18 may be planar as shown in FIG. 4. Inner cutting blade surface 16 may extend outward from inner surface 20, at transition point 24, and may extend to cutting edge 12. Outer cutting blade surface 14 may extend from cutting edge 12 and extend toward a plane of bottom wall 17. In this aspect, cutting edge 18 is shown to be pointed. Inner cutting blade surface 16 and outer cutting blade surface 14 may each slope from cutting edge 12 toward a plane of bottom wall 17 by a substantially equal amount. However, it is understood that cutting edge 18 may be rounded and/or cutting blade surfaces 14 and 16 may be curved. For example, cutting blade 18 may be in the form of a semi-circle.

Unitary elastic mold and cutter combination 100 may further comprise a demolding lip 10 extending outwardly from an outer surface 26 of mold cavity sidewall 25. Demolding lip 10 may be proximate outer cutting blade surface 14 and may extend a substantially equal distance from outer surface 26 of mold cavity sidewall 25 throughout its outer perimeter. In the aspect of demolding lip 10 shown in FIG. 4, its lower surface is sloped. A sloped lower surface of demolding lip 10 may aid in manufacture of mold and cutter combination 100. For example, filling a manufacture pattern having a cavity configured to form mold and cutter combination 100 in an upside down orientation may cause entrapped air to exit demolding lip 10. Additionally, the sloped lower surface may ease demolding of a formed mold and cutter combination 100 from a manufacture pattern.

Figure 5:
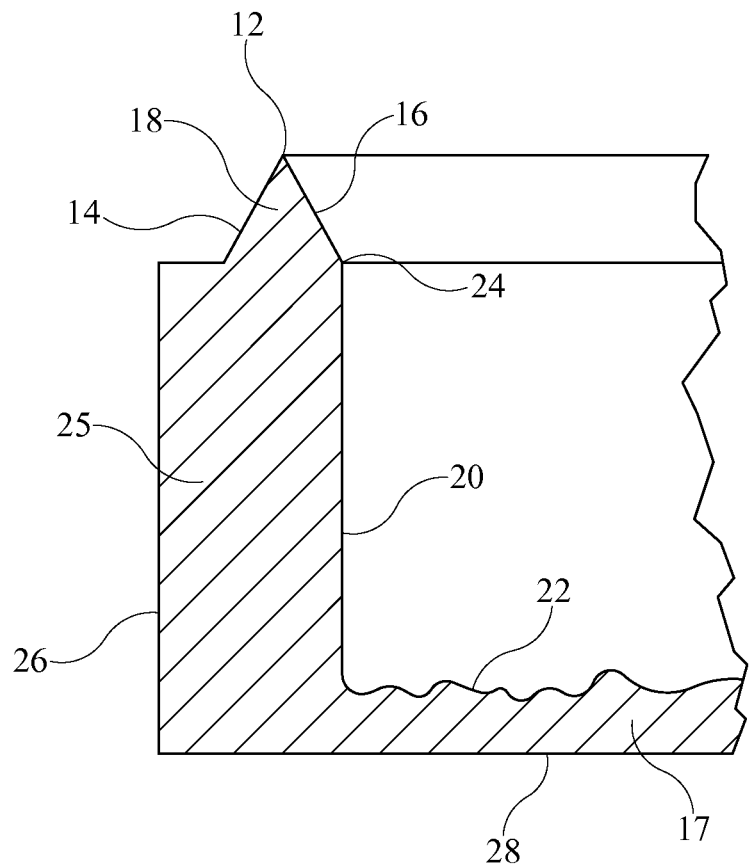
FIG. 5 is a cross-sectional view of a portion of a unitary elastic mold and cutter combination showing relative thicknesses of a cutting blade and mold cavity walls.

FIG. 5 shows a cross-sectional view of an outer portion of an aspect of a unitary mold and cutter combination not having a demolding lip. Bottom wall 17 may be stretchable and may comprise an embossed inner surface 22 and outer surface 28. Sidewall 25 may be stretchable and may extend from and be unitary with a perimeter of bottom wall 17. Cutting blade 18 may be stretchable and may extend from sidewall 25 at transition point 24. Sidewall 25 may have a thickness greater than or equal to a maximum thickness of cutting blade 18.

Figure 6:
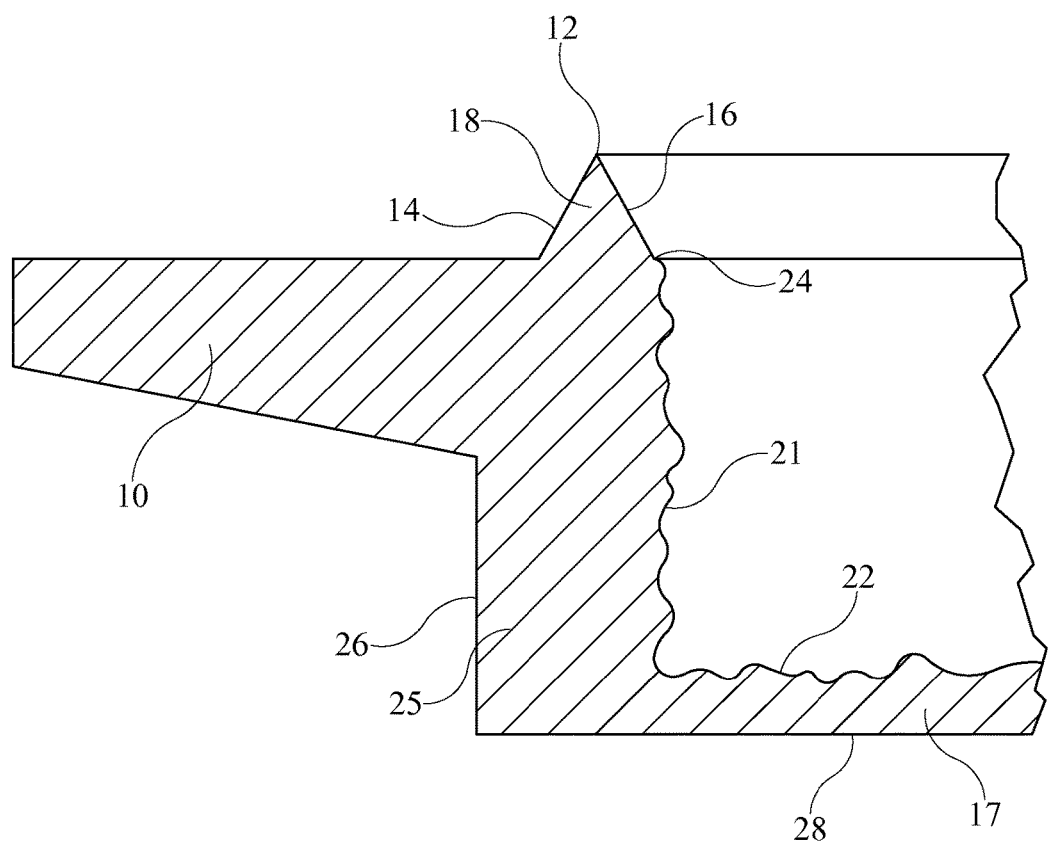
FIG. 6 is a cross-sectional view of a portion of a unitary elastic mold and cutter combination showing an embossed pattern on a bottom wall and a sidewall of a mold cavity.

FIG. 6 shows a cross-sectional view of an outer portion of an aspect of a unitary elastic mold and cutter combination having an embossed pattern on a bottom wall and a sidewall of a mold cavity. Bottom wall 17 may comprise an embossed inner surface 22 and outer surface 28. Elastic sidewall 25 may extend from and be unitary with a perimeter of bottom wall 17. Sidewall 25 may have an outer surface 26 and an embossed inner surface 21. For example, the embossed pattern on embossed inner surface 21 may extend up a portion of sidewall 25 or up to transition point 24, as shown by embossed inner surface 21. Elastic cutting blade 18 may extend from sidewall 25 at transition point 24. Sidewall 25 may have a thickness greater than or equal to a maximum thickness of cutting blade 18. Demolding lip 10 may outwardly extend from an outer surface 26 of mold cavity sidewall 25 and may be proximate outer cutting blade surface 14.

Figure 7:
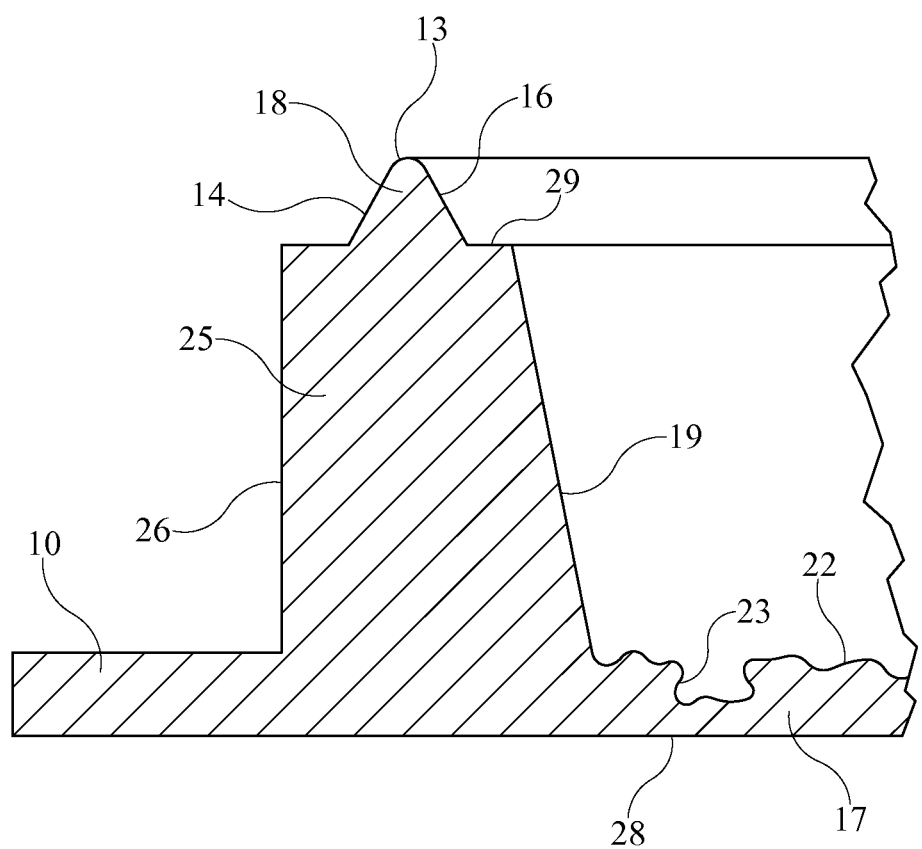
FIG. 7 is a cross-sectional view of a portion of a unitary elastic mold and cutter combination showing the disposition of features thereof.

FIG. 7 is a cross-sectional view of a portion of a unitary elastic mold and cutter combination showing at least some alternative aspects within the scope of the disclosure claimed herein. Bottom wall 17 may comprise an embossed inner surface 22 and outer surface 28. Embossed inner surface 22 may have one or more undercut embossed patterns 23. In this aspect, moldable material may be released from the mold and cutter combination by stretching bottom wall 17 by an amount sufficient to release material molded in undercut 23.

Elastic sidewall 25 may extend from and be unitary with a perimeter of bottom wall 17. Sidewall 25 may have an outer surface 26 and a sloped inner surface 19. For example, sloped inner surface 19 may be configured to aid in the removal of molded material from the mold cavity. Elastic cutting blade 18 may extend from sidewall 25 and may be offset from inner surface 19. For example, sidewall 25 may have offset 29 between inner surface 16 of cutting blade 18 and inner surface 19 of sidewall 25. Sidewall 25 may have a thickness greater than or equal to a maximum thickness of cutting blade 18.

Demolding lip 10 may outwardly extend from an outer surface 26 of mold cavity sidewall 25 and may be proximate bottom wall 17. In the aspect shown in FIG. 7, demolding lip 10 may be an extension of bottom wall 17, extending beyond sidewall 25.

Cutting blade 18 may have a variety of configurations. For example, the aspect of cutting blade 18 shown in FIG. 7 has planar inner and outer surfaces 16 and 14 and a rounded cutting edge 13 therebetween. Advantageously, cutting blade 18 is configured to cut moldable material and maintain a substantially consistent perimeter about cutting edge 13 upon cutting. Therefore, upon an axial force being applied to the mold and cutter combination, cutting blade 18 may compress axially and have negligible or no radial deformation.

Aspects of the present disclosure provide a unitary elastic mold and cutter combination comprising an elastic cutting blade with an elastic cutting edge, configured to cut and mold moldable material. The mold cavity inner wall may comprise a three dimensional shape or an embossing pattern configured to mold the moldable material into a desired shape. The mold and cutter combination may have an elasticity or stretchability sufficient to release molded material therefrom by stretching the mold into a releasing configuration, such as an elongated and/or convex configuration, by hand. The cutting blade may be configured to cut moldable material without collapsing toward or from the mold cavity and elongate upon stretching the mold into a releasing configuration. In at least one aspect, the cutting blade may be configured to cut the moldable material without collapsing inwardly or outwardly. In at least one other aspect, the sidewall of the mold cavity may be configured to support the cutting blade without collapsing inwardly or outwardly, upon cutting. The inner surface of the cutting blade may have an inner perimeter greater than an outer perimeter of the mold cavity, offsetting the cutting blade outwardly from the mold cavity. Further, the cutting blade may have an outer surface sloping away from the cutting edge forming a triangular or wedge shape.

Aspects of the present disclosure provide a mold and cutter combination configured to cut, mold, and release molded material therefrom by hand. Parameters such as the elasticity or stretchability of material of construction, bottom wall thickness, side wall thickness, contour of an embossed pattern on an inner surface of the bottom wall, cutting blade configuration, and other parameters associated with the mold and cutter combination may be specifically defined to cut, mold, and release selected materials therefrom. Therefore, different combinations of parameters and other configurations and features of a mold and cutter combination may be provided for different moldable materials and are to be included within the scope of the present disclosure.

In at least one aspect, a mold and cutter combination has a plurality of mold cavities configured to cut and mold a plurality of similar or differently shaped designs. For example, a plurality of cutting blades may define a plurality of mold cavities in a single mold and cutter combination. In this aspect of the present disclosure, a single demolding lip may extend about the outer perimeter of each outer positioned mold cavity.

An aspect of the mold and cutter combination disclosed herein may have a unitary design and may be configured to provide a cut molded material having an uninterrupted design, with little or no extraneous imprints, and may mold or even emboss the moldable material to or proximate a cut edge. The mold and cutter combination may have a demolding lip extending about the cutting blade configured and disposed to aid in removal of molded material from the mold and cutter combination. The demolding lip may be coincident with or extend a substantially equal distance beyond the cutting blade throughout its outer perimeter or may have portions extending a greater distance beyond the cutting blade proximate preferred stretching points. Aspects of the present disclosure provide a mold and cutter combination with a cutter edge and/or embossed pattern that may be elongated by an amount sufficient to minimize or reduce entrapment of molded material therein. Additionally, aspects of the mold and cutter combination may be comprised of a material configured to bake molded material therein.

Aspects of the unitary elastic mold and cutter combination disclosed herein may be used several ways. For example, the mold and cutter combination may be pressed, cutting blade side down, into a moldable material, such as dough or clay. Alternatively, the mold and cutter combination may be placed cutting blade side up and a sheet of sheeted moldable material may be placed over the mold cavity. The moldable material may then be pressed down into the mold cavity and against the cutting edge with a rolling pin or similar hand tool. The molded material may then be baked in the mold and/or released from the mold by stretching and/or flexing the mold into releasing configuration such as an elongated and/or convex configuration. For example, portions of the demolding lip can be grasped and pulled apart thus stretching the mold cavity. Alternatively or additionally, a user may push against a portion of the bottom wall of the mold cavity while grasping portions of the demolding lip.

Some examples of materials of construction that may possibly be utilized or adapted for use in at least one possible embodiment may possibly be found in the following U.S. patents and publications: U.S. Pat. No. 7,517,933, entitled "Flexible Bakeware", published 2009 Apr. 14; U.S. Pat. No. 6,797,223, entitled "Non-stick Food Processing, Domestic and Industrial Equipment and Process of Using Same", published 2004 Sep. 28; U.S. Pat. No. 6,830,769, entitled "Flexible Mould for Confectionery, Bread-Making and Similar, With Support and Stiffening Element of the Outer Edge", published 2004 Dec. 14; and U.S. Pat. Pub. No. 20010043977, entitled "Use of Silicone for Manufacturing Confectionery Moulds and Baking Receptacles in General", published 2001-11-22.

The patents, patent applications, and patent publication listed above in the preceding paragraph are herein incorporated by reference as if set forth in their entirety. The purpose of incorporating U.S. patents is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

The invention is illustrated by example in the drawing figures, and throughout the written description. It should be understood that numerous variations are possible while adhering to the inventive concept. Such variations are contemplated as being a part of the present disclosure.

AT LEAST A PARTIAL LIST OF NOMENCLATURE

100 Mold and Cutter Combination
10 Demolding Lip
11 Tabs
12 Cutting Edge
13 Rounded Cutting Edge
14 Cutting Blade Outer Surface
16 Cutting Blade Inner Surface
17 Bottom Wall
18 Cutting Blade
19 Sloped Mold Cavity Sidewall Inner Surface
20 Mold Cavity Sidewall Inner Surface
21 Embossed Mold Cavity Sidewall Inner Surface
22 Mold Cavity Embossed Bottom Wall Inner Surface
23 Undercut Embossment
20 Cutting Blade Mold Wall Transition Point
25 Sidewall
26 Mold Cavity Outer Sidewall Surface
28 Mold Cavity Bottom Wall Outer Surface
29 Offset Between Cutting Blade and Mold Cavity Sidewall Inner Surface
150 Mold and Cutter Combination
200 Mold and Cutter Combination with a Plurality of Cutting Blades

The invention claimed is:

1. A method of molding and cutting moldable material comprising the steps of:
   a) rolling a moldable material into a sheet;
   b) placing the rolled sheet of moldable material against a mold and cutter combination and covering at least an inner perimeter portion of an elastic cutting blade, wherein the elastic cutting blade extends from, and is unitary with, an elastic planar wall;
   c) pressing the rolled sheet of moldable material against the elastic cutting blade, thereby compressing the elastic cutting blade toward the elastic planar wall and maintaining a substantially consistent perimeter of the elastic cutting blade, and cutting out a portion of the rolled sheet of moldable material; and d) hand stretching, bending, and/or flexing the mold and cutter combination and thereby releasing the cut moldable material from the mold and cutter combination.

2. The method of claim 1, wherein the step of placing the rolled sheet of moldable material against a mold and cutter combination comprises placing the mold and cutter combination on a surface with the elastic cutting blade side up and placing the sheet of moldable material on the mold and cutter combination and covering at least an inner perimeter portion of the elastic cutting blade.

3. The method of claim 2, wherein the step of pressing the rolled sheet of moldable material against the elastic cutting blade and cutting out a portion of the rolled sheet of moldable material is performed by rolling, with a rolling pin, the sheet of moldable material against the elastic cutting blade.

4. The method of claim 1 further comprising a step of baking the cut moldable material, the step of baking the cut moldable material being performed prior to the step of hand stretching, bending, and/or flexing the mold and cutter combination.

5. The method of claim 1 further comprising a step of imparting embossments, impressions, features, or designs in the moldable material with an embossed inner surface of the mold and cutter combination.

6. The method of claim 1 further comprising a step of pressing the rolled sheet of moldable material into an elastic cavity, wherein the elastic cavity has an inner wall between the elastic cutting blade and the elastic planar wall, the step of pressing the rolled sheet of moldable material into the elastic cavity being performed prior to the step of hand stretching, bending, and/or flexing the mold and cutter combination.

7. The method of claim 6, wherein the step of pressing the rolled sheet of moldable material into an elastic cavity comprises imparting embossments, impressions, features, or designs in the moldable material with an embossed inner cavity wall.

8. The method of claim 1 wherein the step of hand stretching, bending, and/or flexing the mold and cutter combination and thereby releasing the cut moldable material from the mold and cutter combination comprises grasping a demolding lip.

9. The method of claim 1 wherein the step of hand stretching, bending, and/or flexing the mold and cutter combination and thereby releasing the cut moldable material from the mold and cutter combination comprises grasping tabs extending beyond a perimeter of the elastic cutting blade, the tabs being indicative of preferred pulling directions.

10. The method of claim 5 wherein the step of imparting embossments, impressions, features, or designs in the moldable material comprises embossing the moldable material with an undercut in the mold and cutter combination and the step of hand stretching, bending, and/or flexing the mold and cutter combination comprises releasing the cut moldable material from the undercut in the mold and cutter combination.

11. The method of claim 1 wherein the step of pressing the rolled sheet of moldable material against the elastic cutting blade and cutting out a portion of the rolled sheet of moldable material comprises pressing the rolled sheet of moldable material against at least two elastic cutting blades and cutting out at least two portions of the rolled sheet of moldable material.

12. The method of claim 1 wherein the step of hand stretching, bending, and/or flexing the mold and cutter combination and thereby releasing the cut moldable material from the mold and cutter combination comprises stretching both the elastic cutting blade and the elastic planar wall.

13. The method of claim 6 wherein the step of hand stretching, bending, and/or flexing the mold and cutter combination and thereby releasing the cut moldable material from the mold and cutter combination comprises stretching the elastic cutting blade, the elastic cavity wall, and the elastic planar wall.

14. The method of claim 1, wherein the step of placing the rolled sheet of moldable material against a mold and cutter combination comprises placing the sheet of moldable material on a surface and placing the mold and cutter combination onto the rolled sheet of moldable material, with the elastic cutting blade side down against the sheet of moldable material.

15. The method of claim 1, wherein the moldable material is selected from the group consisting of clay, dough, modeling chocolate, gum paste, fondant, pastillage, and other confectionary compositions and craft moldable compounds.

16. The method of claim 1, wherein the step of hand stretching, bending, and/or flexing the mold and cutter combination and thereby releasing the cut moldable material from the mold and cutter combination comprises moving a portion of the elastic planar wall extending outside of a perimeter of the elastic cutting blade.

17. The method of claim 1, wherein the step of hand stretching, bending, and/or flexing the mold and cutter combination and thereby releasing the cut moldable material from the mold and cutter combination comprises expanding the elastic cutting blade and the elastic planar wall.

18. The method of claim 1, wherein the step of hand stretching, bending, and/or flexing the mold and cutter combination and thereby releasing the cut moldable material from the mold and cutter combination comprises bending or flexing the elastic planar wall with the application of forces perpendicular to the elastic planar wall.

19. The method of claim 1, wherein the step of hand stretching, bending, and/or flexing the mold and cutter combination and thereby releasing the cut moldable material from the mold and cutter combination comprises putting the mold and cutter combination into an elongated or convex configuration.

* * * * *